Patented Mar. 23, 1937

2,074,493

UNITED STATES PATENT OFFICE 2,074,493

PROCESS OF PURIFICATION OF GLAND EXTRACTS

Wilbur Willis Swingle and Joseph John Pfiffner, Princeton, N. J., assignors to Parke, Davis & Company, Detroit, Mich., a corporation of Michigan No Drawing. Application September 4, 1930, Serial No. 479,802. Renewed May 17, 1935

3 Claims. (Cl. 167—77)

The invention relates to a process for purification of glandular extracts and the products obtained thereby. More particularly the invention relates to a purified extract containing the hormone of the suprarenal cortex and the method of obtaining such extract.

We have discovered that it is possible to purify solutions containing the hormone of the suprarenal cortex by subjecting the solution to a treatment with certain complex silicates such as zeolites of which permutit is a typical example. By passing the solution through a filter containing permutit a large amount of the foreign material contained in the solution is removed while the active principle or hormone passes through unchanged. The filtrate therefore contains all of the activity of the original solution but in such a purified state that the local reaction upon subcutaneous injection of the same is reduced to a negligible amount.

One method of carrying out our invention is to use the 70% alcoholic solution of the hormone of the suprarenal cortex obtained in accordance with the directions given in our copending application Serial No. 478,558 filed August 28, 1930. In the application referred to the adrenal glands of cattle are first extracted with ethyl alcohol, then treated with benzene to remove proteins, inert material and epinephrine. The benzene is removed from the solution and acetone added to remove phospholipids. The acetone is then removed and the residue treated with petroleum ether and aqueous alcohol to separate neutral fat and cholesterol. The result of this treatment is that the hormone is retained in the 70% alcoholic solution and it is from this point that our improved method of purification is advantageously carried out.

The alcoholic solution contains 1.49 grams of solids including 36 milligrams of epinephrine. The solvents are removed by distillation in partial vacuo at an external bath temperature of 45–50° C. Toward the end of the distillation small quantities (about 30 to 50 cc.) of absolute ethyl alcohol are added to facilitate the removal of most of the water. The residue is dissolved in 100 cc. of 95% ethyl alcohol. The solution thus formed is filtered through permutit in order to remove foreign materials from the solution while retaining the entire activity of the hormone.

A convenient method for carrying out this phase of the process consists in the use of two filtering tubes, one above the other, in each of which there is placed a small pledget of cotton and a layer of permutit. The solution is then caused to flow through the filtering tubes at the rate of about 1 to 2 drops per second. After the alcoholic solution of the hormone has entered the filter the permutit is washed first with a 100 cc. portion of 95% ethyl alcohol and then with a 300 cc. portion. These are allowed to pass through the filters at about the same rate as the alcoholic solution of the hormone and the flow is controlled so that the level of the wash alcohol in the filtering tube is preferably a few centimeters above the level of the permutit. A gentle suction is required at the end of the washing.

The alcoholic filtrate resulting from the above process contains much less solids than the original 70% alcoholic solution. If desired the filtration may be repeated the second time. The alcoholic solution is concentrated to about 100 cc. and 70 cc. of distilled water are added. The amount of water added at this point depends on the concentration of extract desired. The alcohol is removed and the extract diluted to 100 cc. with distilled water. A milky suspension is obtained which can be very rapidly and conveniently clarified and sterilized by passing through a Seitz filter.

The filtered extract is crystal clear and very pale yellow in color. The finished extract contains less than 0.3 gram of solids including approximately 0.05 mg. of epinephrine. Thus the permutit filtration has removed more than a gram of solids including 35 milligrams of epinephrine while the potency of the extract is as good as the original solution. By the addition of sodium chloride the extract may be rendered isotonic and the solution may be standardized so that 1 cc. represents 30 grams of fresh cortex.

The permutit used in the process outlined above can be reclaimed by washing it thoroughly with concentrated sodium chloride solution, then with distilled water and dried.

While we have indicated above one method of procedure for carrying out our invention, it is to be clearly understood that the invention in its broader aspects is capable of other embodiments. We have discovered that any solution containing the active principle of the suprarenal cortex may be passed through permutit without loss of potency. For example any of the following solvents for suprarenal cortex hormone may be used: Ether, petroleum-ether, other alcohols such as propyl alcohol and butyl alcohol, acetone, water, etc.

Thus the filtration through zeolites may if desired be carried out earlier in the sequence of steps given in our co-pending application.

In the above description the term permutit is used to designate a well known material used primarily for water softening processes. Our invention, however, is not limited to this exact material but may be carried out by using other similar materials of the type known as base exchange materials. Complex silicates such as zeolites or other materials which are capable of causing an exchange of bases can be used.

It is probable that this material acts to remove certain organic bases which are present in the extracts obtained from the suprarenal gland and to substitute inorganic bases therefor. The removal of such organic bases results in a purification of the extract to a degree that it can be injected subcutaneously in large amounts without causing local irritation at the site of injection. Therefore our invention results in obtaining a highly purified extract containing the cortical hormone and makes available a therapeutic product of great value. This product is suitable for subcutaneous, intraperitoneal, and intravenous use in man and animals.

What we claim as our invention is:

1. The method of purifying an extract of the suprarenal gland containing the cortical hormone comprising dissolving material from the cortical portion of the suprarenal gland in a solvent capable of preserving the activity thereof, separating therefrom proteins, inert material, epinephrine, phospholipids, neutral fat and cholesterol, dissolving the cortical hormone obtained from the previous steps in 70% alcoholic solution, distilling said solution in partial vacuo to remove solvents and water, dissolving the residue in 95% ethyl alcohol, and filtering said alcoholic solution through permutit thereby obtaining the entire activity of the cortical hormone free from epinephrine.

2. In the process of purifying an extract of the suprarenal cortex containing the cortical hormone the step of filtering a solution containing the cortical hormone and epinephrine through permutit and obtaining in the filtrate the cortical hormone free from epinephrine without loss of cortical hormone activity.

3. In the process of purifying an extract of the suprarenal cortex containing the cortical hormone, the step of filtering a solution containing the cortical hormone and epinephrine through zeolite thereby obtaining in the filtrate the cortical hormone free from epinephrine without loss of cortical hormone activity.

WILBUR WILLIS SWINGLE.
JOSEPH JOHN PFIFFNER.